Figure 1:
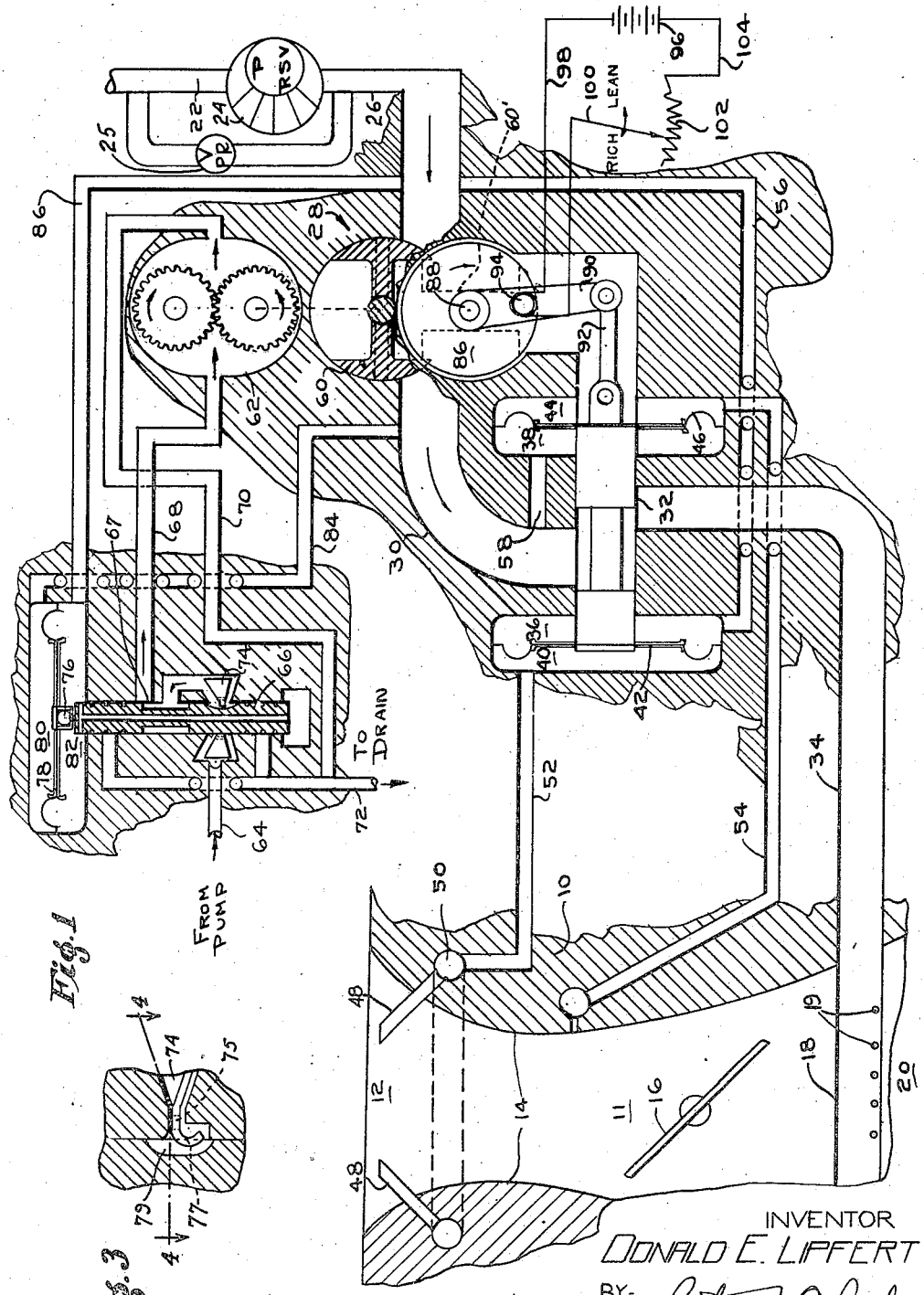

July 9, 1946.　　D. E. LIPFERT　　2,403,866
CHARGE FORMING DEVICE
Filed Oct. 5, 1943　　2 Sheets-Sheet 2

INVENTOR.
DONALD E. LIPFERT
BY Lester W Clark
AGENT

Patented July 9, 1946

2,403,866

UNITED STATES PATENT OFFICE 2,403,866

CHARGE FORMING DEVICE

Donald E. Lipfert, Meriden, Conn., assignor to Chandler-Evans Corporation, South Meriden, Conn., a corporation of Delaware Application October 5, 1943, Serial No. 505,027

9 Claims. (Cl. 261—37)

The present invention relates to fuel supply systems for internal combustion engines, and particularly to systems of the type in which the quantity of fuel supplied to the engine is controlled in proportion to the quantity of air flowing to the engine.

In fuel supply systems of the type in which the fuel flow is proportioned with respect to the air flow, it is customary to produce a force varying as a function of the air flow by the use of some metering device such as a venturi, and to produce another force varying as a similar function of the quantity of fuel by means of a similar metering device. The metering devices commonly used to measure the fuel flow are either of the Venturi type or of the fixed restriction type, wherein the pressure differential across the restriction is utilized as a measure of the fuel flow. The two forces, one varying with the air flow and the other varying with the fuel flow, act in opposition to control a valve in the fuel conduit and thereby maintain the fuel supply proportional to the quantity of air flowing to the engine.

With the types of fuel pumps commonly used, the pressure of the fuel supplied to the fuel measuring and controlling system is subject to variations. Likewise, the pressure on the fuel at the point where it is discharged from the fuel conduit varies in accordance with several different conditions, as, for example, the pressure in the intake manifold. In the usual type of fuel metering system, means must be provided to prevent variation of the fuel flow because of these varying pressures. Such means may be readily provided, but they add to the complication and weight of the system.

It is therefore an object of the present invention to provide an improved fuel supply system for an internal combustion engine of the type in which the fuel is supplied under a pressure greater than atmospheric, and is controlled in proportion to the quantity of combustion air entering the engine.

Another object of the present invention is to provide, in a fuel supply system of the type described, means for measuring the fuel flow which is completely independent of the variations in pressure at the inlet and outlet of the fuel conduit.

Another object is to provide a fuel supply system of the type described in which a rotary flow meter is used to measure the fuel flow.

A further object is to provide such a system in which the rotating element of a flow meter is driven by an external source of power so as to maintain a constant difference of pressure across the element, and thereby to prevent inaccuracy due to varying leakage past the meter at different fuel flows.

Other objects and advantages of the present invention will become apparent from a consideration of the appended specification, claims and drawings, in which Figure 1 represents, somewhat diagrammatically, a carburetor for an internal combustion engine embodying the principles of my invention.

Figure 2:
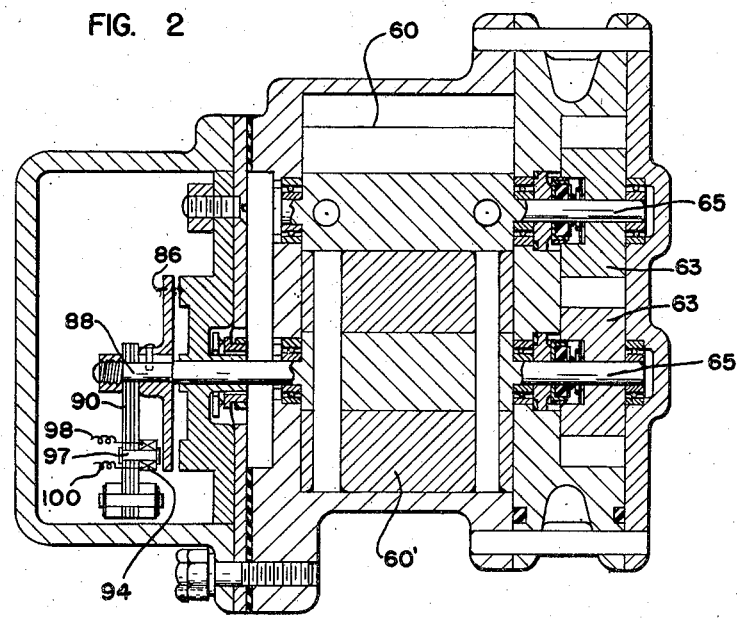
Figure 4:
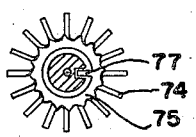

Figure 2 is a cross-sectional view of a flow meter and associated elements generally corresponding to those shown diagrammatically in Figure 1, Figure 3 is a cross-sectional view, on an enlarged scale, of certain elements appearing in Figure 1, and Figure 4 is a cross-sectional view taken on the line 4—4 of Figure 3.

The invention is illustrated as applied to a carburetor of the type generally used on an aircraft engine. There is shown at 10 a portion of a carburetor body having an air passage 11 extending therethru. Air enters the passage 11 at an inlet 12 and flows past a Venturi restriction 14, a throttle 16, and a fuel discharge nozzle 18 to an outlet 20.

The fuel and air mixture leaving the outlet 20 usually passes thru a supercharger driven thru gearing by the engine to the engine intake manifold. The air entering the inlet 12 may either be drawn directly from the atmosphere, in which case a scoop is provided to take advantage of the ram effect due to the motion of the aircraft, or it may be supplied thru another supercharger which may be gear driven by the engine, or may be driven by a turbine powered by the exhaust gases.

The fuel supply for the engine comes from a tank (not shown) and passes thru a conduit 22, a fuel pump 24, a conduit 26, a flow meter generally indicated at 28, a conduit 30, past a valve 32, and thru a conduit 34 to the discharge nozzle 18 and the outlet orifices 19 therein. The fuel pump may be provided with a pressure relief valve 25 for maintaining its discharge pressure substantially constant.

Valve 32 is of the piston type and reciprocates in a cylinder whose opposite ends open into chambers 36 and 38. The chamber 36 is separated from an adjacent chamber 40 by a flexible diaphragm 42. The chamber 38 is likewise separated from an adjacent chamber 44 by a flexible diaphragm 46.

The air pressure at the inlet 12 is communicated thru a plurality of impact tubes 48, a passage 50 interconnecting the impact tubes and a conduit 52 to the chamber 40. The chamber 44 is connected thru a passage 54 to the throat of venturi 14. The chamber 36 is connected thru a conduit 56 to the conduit 26 upstream from the flow meter 28. The chamber 38 is connected thru a conduit 58 to the conduit 30 downstream from the flow meter 28.

From the known characteristics of Venturi meters, it will be apparent that the pressure differential between the inlet 12 and the throat of venturi 14 is a measure of the velocity of air flowing thru the passage 11. This pressure differential is communicated to the chambers 40 and 44, where it acts on the valve 32 in an opening direction with a force proportional to the quantity of air flowing thru passage 11.

The pressure differential, if any, across the flow meter 28 is communicated to the chambers 36 and 38 where it acts on valve 32.

The flow meter 28 includes a pair of rotating elements, one of which is shown at 60. These elements rotate on shafts geared together so as to maintain the elements in the proper angular relationship. The rotating elements of the meter 28 are driven by a fluid motor 62, of the gear type. The fluid motor 62 is supplied with motive fluid, for example oil, which flows from a pump (not shown) thru a conduit 64, a valve 66, a conduit 68, fluid motor 62, and a conduit 70 to a drain conduit 72. The valve 66 is of the cylindrical type, and is movable longitudinally to open and close a port 67 so as to control the supply of fluid to the motor 62. A number of vanes 74 are attached to a hub 75 having a key 77 cooperating with a keyway 79 on the valve 66 and are positioned in the path of the fluid so that the cylindrical valve 66 is continuously rotated about its axis. By means of this continual rotation, the valve 66 is prevented from sticking, and its ease of movement is assured. Also, by this construction, the vanes 74 do not interfere with vertical movements of valve 66. I prefer to form the vanes 74, the hub 75 and the key 77 from a single flat stamping, by twisting the vanes 74 and key 77 from the plane of the stamping, as illustrated.

The upper end of valve 66 is journaled in a bearing 76 attached to a flexible diaphragm 78 which separates a pair of expansible chambers 80 and 82. The chamber 80 is connected thru a conduit 84 to the conduit 30 on the downstream side of meter 28 and the chamber 82 is connected thru a conduit 86 to the conduit 26 on the upstream side of meter 28.

It may be seen that the valve 66 is controlled in accordance with the pressure differential across the flow meter 28, and that it is operated in an opening therein upon an increase in this pressure differential so as to increase the supply of motive fluid to gear motor 62, thereby increasing the speed of gear motor 62 and of meter 28 and decreasing the pressure differential across meter 28 until it is restored to its previous value. Furthermore, the pressure differential across flow meter 28 acts on valve 32 in a direction to vary the pressure downstream from flow meter 28 so as to reduce the pressure differential across the flow meter. For example, if the pressure upstream from the flow meter 28 tends to increase, the valve 32 is moved toward its closed position, thereby increasing the pressure on the downstream side of the flow meter 28 and decreasing the pressure differential.

By these means, the pressure differential across the flow meter is maintained at a small, substantially constant value. Therefore the leakage past the rotating elements of the flow meter is the same, regardless of the speed with which the flow meter operates, because the pressure differential is always the same.

A disc 86, of electrically conductive material, is attached to shaft 88 of the flow meter 28, so that it is rotated at the same speed as the flow meter. An arm 90 is freely pivoted on the shaft 88 at one end, and at its opposite end is pivotally connected to a link 92 whose opposite end is in turn pivotally attached to the valve 32.

An electromagnet 94 is mounted on the arm 90 adjacent the disc 86. The electromagnet 94 is energized thru an electrical circuit which may be traced from the upper terminal of a battery 96 thru a conductor 98, the electromagnet 94, a conductor 100, a variable resistance 102, and a conductor 104 to the lower terminal of battery 96.

As the fuel flows thru the meter 28, the disc 86 is rotated clockwise. Since this disc intersects the magnetic field of the electromagnet 94, it reacts with that field and produces a force acting on the electromagnet 94 and tending to drag it in the same direction as the disc is rotated. Since this direction is clockwise, it may be seen that this force is transmitted thru arm 90 and link 92 to the valve 32 and that it acts on valve 32 in a closing direction.

There is shown in Figure 2 a preferred form of flow meter mechanism which may be used in place of that indicated diagrammatically in Figure 1. The various elements of the mechanism of Figure 2 have the same reference characters as the corresponding elements of Figure 1. The gear pump 62 comprises two gears 63 fixed on shafts 65, on which are mounted the two rotary meter elements 60, 60'. The other end of meter element 60' is attached to the shaft 88 which carries the rotating disc 86. The arm 90 is illustrated as being laminated, and is freely rotatable on the shaft 88. The arm 90 carries core 97 of an electromagnet whose winding is illustrated at 94.

From the foregoing, it may be seen that the flow meter 28 and the electromagnet 94 cooperate to produce a force which acts in a closing direction on valve 32 and which is proportional to the quantity of fuel flowing to the engine.

The valve 32 is therefore positioned in accordance with the difference between a force proportional to the quantity of air flowing to the engine and an opposing force proportional to the quantity of fuel flowing to the engine. Since the valve 32 controls the quantity of fuel, it may be seen that the quantity of fuel is therefore proportioned with respect to the quantity of air.

The quantity of fuel supplied with any given quantity of air may be controlled by manipulation of the variable resistance 102. For example, if the resistance 102 is increased, the energization of electromagnet 94 is decreased and the force acting in the closing direction on valve 32 is thereby decreased. If the air flow remains constant, then the air pressure differential and hence the force acting on valve 32 in an opening direction also remain constant. Therefore, when the closing force acting on valve 32 is decreased, the opening and closing forces are unbalanced, and the valve moves in an opening direction. The opening movement of valve 32 increases the fuel flow and decreases the pressure in the conduit 30 between the flow meter 28 and valve 32. A pressure differential is thereby created across the rotating meter elements 60. This pressure differential is communicated to diaphragm 78, on which it acts upwardly, thereby tending to increase the flow of fluid to gear motor 62 and hence the speed of that motor. The increase in speed of motor 62, elements 60 and disc 86 continues until the torque applied thru electromagnet 94 to arm 90 applies a force to the valve 32 in a closing direction which balances the opening force. During the operation just described, the air flow has remained constant, but the fuel flow has been increased by the opening movement of valve 32. Therefore, a new value of fuel-to-air ratio is obtained, richer than the fuel-to-air ratio which previously existed. The increased fuel flow is reflected in the increased speed of meter 28.

The relief valve which regulates the discharge pressure on this type of pump is usually referred to as a constant pressure relief valve, and the pump is therefore usually called a constant pressure discharge pump. However, in the usual relief valve structure, the discharge pressure acts against a spring to control the position of the valve. If the pressure increases, the spring is compressed and the valve is opened wider, tending to restore the valve to its previous position. However, each increment of valve opening requires an increment of pressure increase to compress the spring and produce the valve opening. Therefore, the pump discharge pressure is not maintained absolutely constant, but varies over a limited range depending on the pump speed and rate of flow. Since the pump is usually engine driven, its speed may vary considerably.

From the foregoing, it should be apparent that a change in the discharge pressure of the fuel pump will not affect the fuel flow. For example, if the discharge pressure of the fuel pump increases, the pressure differential across meter 28 is increased, causing a shifting of valve 66 and thus an increased supply of motive fluid to fluid motor 62, thereby driving the motor 62 and meter 28 faster. The more rapid rotation of meter 28 results in a greater force acting in a closing direction on valve 32. As previously described, the valve 32 is subject to a force due to the air pressure differential, which force acts in an opening direction on the valve, and a force due to the speed of flow meter 28, which force acts in a closing direction on the valve. As long as these opposite forces are equal, the valve remains stationary, but when an unbalance exists between them the valve moves in a direction to vary the fuel flow. The change in the fuel flow produces a temporary pressure differential across meter 28, which acts on diaphragm 78 to move valve 66 and change the meter speed. The speed of meter 28 is changed in the proper sense to reestablish the balance between the two forces. If, as in the present example, the closing force exceeds the opening force, then the valve starts moving toward closed position. This reduces the fuel flow, and since the speed of the meter 28 is determined by the speed of gear motor 62, the meter 28 momentarily turns faster than the fuel flow thru it warrants. This increases the pressure on the downstream side of meter 28. The pressure differential thereby established across meter 28 acts on diaphragm 78 in a downward direction to decrease the supply of motive fluid to gear pump 62, thereby decreasing the speed of gear pump 62 and meter 28 and restoring the pressure differential across meter 28 to its normal, substantially constant value. This decrease in speed of meter 28 is reflected by a decrease in the force applied thru electromagnet 94 to the valve 32. As this speed and the closing force on valve 32 gradually decrease, a point is reached where the closing force exactly balances the opening force applied to valve 32 by the diaphragms 42 and 46. At this point, the motion of valve 32 ceases and the change in speed of meter 28 also ceases.

Although certain operations, such as the movement of valve 32, the movement of valve 66, and the change in speed of meter 28 have been described above as taking place sequentially, it should be realized that in actual practice the three actions take place substantially simultaneously. There is some lag, however, between each movement of valve 32 and the corrective response in the speed of meter 28. In order to overcome the effect of this lag, I have provided the chambers 36 and 38, which are connected to the fuel line at points on the upstream and downstream sides of meter 28, respectively. Under balanced conditions, when the pressure differential across the meter 28 has its normal, substantially constant value, that pressure differential has no effect on the position of valve 32, since it is always constant and in the same direction regardless of the position of the valve 32. When the pressure differential across meter 28 changes, however, this change is communicated to the chambers 36 and 38 where it produces a force acting on valve 32 proportional to the pressure differential. This force is applied immediately to the valve 32, as contrasted to the force which is eventually applied to valve 32 thru the action of diaphragm 78, valve 66, gear motor 62, disc 86, electromagnet 94, and arm 90. As soon as this latter train of mechanism has responded to the pressure differential to restore it to its normal value, the pressure differential in chambers 36 and 38 is likewise restored to its normal value and then has no controlling effect. The action of the pressure differential applied to diaphragms 42 and 46 thru chambers 36 and 38 provides an anticipation of the change in force which is finally applied to the valve thru electromagnet 94. The lag of the system is thereby reduced, and the system is made more sensitive and has less tendency to hunt. The chambers 36 and 38 may be readily omitted, or connected to a suitable source of constant fluid pressure, if the response of the system controlling the speed of meter 28 is fast enough.

Since my device uses a rotating type of flow meter, it may be readily combined with an instrument which indicates or records the fuel flow as measured by the velocity of the rotating meter as shown, for example, in the patent to Lyon No. 1,955,754, or with a device which records the total quantity of fuel consumed, as shown, for example, in the patent to Blum No. 1,423,597. If either of these indicating instruments is used, its indication may be readily transmitted to a remote location by means of a telemetric system, which may be of the well-known electrical Selsyn type.

I have illustrated in the present specification only the essential features of my invention. Those skilled in the art will readily recognize that accessories and other features commonly found on other carburetors of this general type may be readily added to the carburetor I have disclosed. For example, any suitable means may be provided to compensate the action of the carburetor for variation in the density of the air entering the carburetor. Other means may be provided to control the fuel to air ratio in accordance with the throttle position when the motor is idling. Also, suitable means may be provided for increasing the fuel to air ratio automatically under heavy load conditions. Examples of suitable devices for these purposes are illustrated in the co-pending application of Milton E. Chandler, Serial No. 493,071, filed July 1, 1943.

While I have shown and described a preferred embodiment of my invention, other modifications thereof will readily occur to those skilled in the art, and I therefore intend my invention to be limited only by the appended claims.

I claim as my invention:

1. In a fuel supply system for an internal combustion engine, a first conduit for air flowing to said engine for combustion purposes, a fuel pump for supplying fuel to said engine under superatmospheric pressure, a second conduit for conveying fuel discharged from said pump, a valve in said second conduit, a flow meter associated with said second conduit including a rotating element of the fluid displacement type in said second conduit, fluid motor means for rotating said element, an external source of motive fluid under pressure, valve means for controlling the supply of motive fluid to said motor means, said valve means including a cylindrical valve member adapted to move longitudinally to vary said motive fluid supply, a plurality of vanes attached to said valve and lying in the path of the fuel flowing thru said valve member so as to continuously rotate it on its seat, a flexible diaphragm connected to said valve member for causing longitudinal movement thereof, means for applying the pressure differential across said meter element to the opposite sides of said diaphragm to position said valve, means for producing a force varying as a function of the speed of rotation of said meter element, means associated with said first conduit for producing two unequal pressures whose difference varies as a function of the quantity of air flowing therethru, and means responsive to said force and to the difference of said two unequal pressures for controlling the valve in the second conduit.

2. In a fuel supply system for an internal combustion engine, a first conduit for air flowing to said engine for combustion purposes, a fuel pump for supplying fuel to said engine under superatmospheric pressure, a second conduit for conveying fuel discharged from said pump, a valve in said second conduit, a flow meter associated with said second conduit including a rotating element of the fluid displacement type in said second conduit, motor means for rotating said element, an external source of power for said motor means, means responsive to the difference in pressure across said element for controlling the supply of power to said motor means so as to drive said element at a speed proportional to the rate of fuel flow and thereby to maintain a constant pressure difference across said element, means for producing a first force varying as a function of the speed of rotation of said meter element, means associated with said first conduit for producing a second force varying as a function of the quantity of air flowing therethru, means responsive to the resultant of said forces for controlling said valve so as to maintain the fuel flow in proportion to the air flow, and means for varying the relationship between said first force and the speed of said element to control the fuel to air ratio.

3. In a fuel supply system for an internal combustion engine, a first conduit for conveying air to said engine for combustion purposes, a fuel pump for supplying fuel to said engine under superatmospheric pressure, a second conduit for conveying fuel discharged from said pump, a valve for controlling the flow of fuel thru said second conduit, a flow meter associated with said second conduit including a rotating element of the fluid displacement type in said second conduit, motor means for rotating said element, an external source of power for said motor means, means responsive to the pressure differential across said meter element for controlling the supply of power to said motor means so as to drive said element at a speed proportional to the rate of fuel flow and thereby to maintain a constant pressure difference across said element, a disc of electrically conductive material attached to said rotating element, an electromagnet positioned adjacent said disc and attached to said valve for applying to said valve a first force acting in a closing direction and varying in accordance with the speed of rotation of said disc, means associated with said first conduit for producing a second force varying in accordance with the quantity of air flowing therethru and applying said force to said valve in an opening direction, and means for varying the energization of said electromagnet so as to vary the relationship between the speed of said element and said first force and thereby to control the fuel to air ratio.

4. In a fuel supply system for an internal combustion engine, a first conduit for air flowing to said engine for combustion purposes, a fuel pump for supplying fuel to said engine under superatmospheric pressure, a second conduit for conveying fuel discharged from said pump, a valve in said second conduit, a flow meter associated with said second conduit including a rotating element of the fluid displacement type in said second conduit, motor means for rotating said element, an external source of power for said motor means, means responsive to the difference in pressure across said element for controlling the supply of power to said motor means so as to drive said element at a speed proportional to the rate of fuel flow and thereby to maintain a constant pressure difference across said element, means for producing a first force varying as a function of the speed of rotation of said meter element, means associated with said first conduit for producing a second force varying as a function of the quantity of air flowing therethru, and means responsive to the resultant of said forces for controlling said valve so as to maintain the fuel flow proportional to the air flow.

5. In a fuel supply system for an internal combustion engine, a first conduit for conveying air to said engine for combustion purposes, a fuel pump for supplying fuel to said engine under superatmospheric pressure, a second conduit for conveying fuel discharged from said pump, a valve for controlling the flow of fuel thru said second conduit, a flow meter associated with said second conduit including a rotating element of the fluid displacement type in said second conduit, fluid motor means for rotating said element, an external source of motive fluid under pressure, valve means for controlling the supply of motive fluid to said motor, means responsive to the pressure differential across said meter element to control said valve means, a disc of electrically conductive material attached to said rotating element, means for applying to said valve a force acting in a closing direction and varying in accordance with the speed of rotation of said disc, means associated with said first conduit for producing two unequal pressures whose difference is a measure of the quantity of air flowing therethru, and means responsive to the difference of said two unequal pressures for applying to said valve a force acting in an opening direction, said forces being effective to position said valve so as to control the fuel flow in proportion to the air flow.

6. In a fuel supply system for an internal combustion engine, a first conduit for conveying air to said engine for combustion purposes, a fuel pump for supplying fuel to said engine under superatmospheric pressure, a second conduit for conveying fuel discharged from said pump, a valve for controlling the flow of fuel thru said second conduit, a flow meter associated with said second conduit including a rotating element of the fluid displacement type in said second conduit, fluid motor means for rotating said element, an external source of motive fluid under pressure, valve means for controlling the supply of motive fluid to said motor, means responsive to the pressure differential across said meter element to control said valve means, a disc of electrically conductive material attached to said rotating element, means including an electromagnet positioned adjacent said disc and attached to said valve for applying to said valve a force acting in a closing direction and varying in accordance with the speed of rotation of said disc, means associated with said first conduit for producing two unequal pressures whose difference is a measure of the quantity of air flowing therethru, and means responsive to the difference of said two unequal pressures for applying to said valve a force acting in an opening direction, said forces being effective to position said valve so as to control the fuel flow in proportion to the air flow.

7. In a fuel supply system for an internal combustion engine, a fuel pump for supplying fuel to said engine under superatmospheric pressure, a conduit for conveying fuel discharged from said pump, a valve in said conduit, a flow meter associated with said conduit including an element rotating therein at a speed proportional to the quantity of fuel flowing therethru, means for driving said element from an external source of power so as to minimize the pressure differential across said element, means responsive to the speed of said element for applying a closing force to said valve varying in accordance with the quantity of fuel flowing therethru, means responsive to the pressure differential across said element for applying an additional force to said valve so that said valve acts to reduce said pressure differential, and means for applying an opening force to said valve so as to control the fuel flow therethru.

8. A fuel supply system for an internal combustion engine comprising a fuel pump, a conduit for fuel flowing from said pump toward said engine, a flow meter associated with said conduit including a rotatable fluid displacement element therein, motor means for driving said element, a source of energy, means responsive to the pressure differential across said element for controlling the supply of energy to said motor means so as to maintain said pressure differential substantially constant and thereby to cause operation of said element at a speed proportional to the rate of flow of fuel thru said conduit, means for controlling the flow of fuel thru said conduit, means responsive to the speed of said element for applying to said flow controlling means a force varying as a function of said rate of fuel flow, and additional means responsive to said pressure differential for applying a force directly to said flow controlling means to anticipate changes in the force applied by said speed responsive means.

9. A fuel supply system for an internal combustion engine comprising a conduit for fuel flowing toward said engine, a flow meter associated with said conduit including a rotatable fluid displacement element therein, motor means for driving said element, a source of energy, means responsive to the pressure differential across said element for controlling the supply of energy to said motor means so as to maintain said pressure differential substantially constant and thereby to cause operation of said element at a speed proportional to the rate of flow of fuel thru said conduit, means for controlling the flow of fuel thru said conduit, means responsive to the speed of said element for applying to said flow controlling means a force acting in a flow decreasing direction and varying as a function of said rate of fuel flow, and means responsive to the rate of flow of combustion air to said engine for applying to said flow controlling means a force acting in a flow increasing direction and varying as a function of said rate of combustion air flow.

DONALD E. LIPFERT.